(12) United States Patent
Valeri et al.

(10) Patent No.: US 7,067,565 B2
(45) Date of Patent: Jun. 27, 2006

(54) EPOXY/ACRYLATE BASED PRIMER COATING COMPOSITIONS AND THEIR USE IN THE OPTICAL FIELD

(75) Inventors: Robert A. Valeri, Tampa, FL (US); Kimberly D. Anderson, St. Petersburg, FL (US); Sidney S. White, North Seminole, FL (US)

(73) Assignee: Essilor International Compagnie Generale d'Optique, Charenton Cedex (FR)

( * ) Notice: Subject to any disclaimer, the term of this patent is extended or adjusted under 35 U.S.C. 154(b) by 296 days.

(21) Appl. No.: 10/157,177

(22) Filed: May 29, 2002

(65) Prior Publication Data

US 2003/0118833 A1    Jun. 26, 2003

Related U.S. Application Data

(60) Provisional application No. 60/294,424, filed on May 29, 2001.

(51) Int. Cl.
*C08F 2/46* (2006.01)
*C08J 3/28* (2006.01)
*C08J 7/04* (2006.01)

(52) U.S. Cl. .......... 522/170; 522/100; 522/103; 522/181; 522/150; 522/153; 522/168; 522/182; 428/411.1; 428/412; 428/413; 428/419; 428/423.1; 427/508; 427/512; 427/518; 525/937; 523/106

(58) Field of Classification Search ........ 522/100, 522/103, 181, 150, 153, 168, 170, 182; 523/106, 523/107, 108; 525/937; 427/508, 512, 518; 428/411.1, 412, 413, 414, 415, 419, 423.1
See application file for complete search history.

(56) References Cited

U.S. PATENT DOCUMENTS

| 4,156,035 | A |   | 5/1979 | Tsao et al. ............... 427/44 |
|-----------|---|---|--------|-----------------------------------|
| 4,211,823 | A |   | 7/1980 | Suzuki et al. ........... 428/412 |
| 5,015,523 | A |   | 5/1991 | Kawashima et al. ...... 428/336 |
| 5,036,128 | A | * | 7/1991 | Durand ................... 524/440 |
| 5,096,626 | A |   | 3/1992 | Takamizawa et al. ...... 264/1.7 |
| 5,160,668 | A |   | 11/1992 | Imus .................... 264/1.7 |
| 5,547,618 | A |   | 8/1996 | Magne .................. 264/1.36 |
| 5,662,839 | A |   | 9/1997 | Magne .................. 264/1.38 |
| 5,733,483 | A |   | 3/1998 | Soane et al. ............ 264/1.7 |
| 5,739,214 | A | * | 4/1998 | Schunck ................ 525/438 |
| 6,617,370 | B1| * | 9/2003 | Ueno ...................... 522/6 |

FOREIGN PATENT DOCUMENTS

| EP | A-102847 | 3/1984 |
| EP | 0431213 | 6/1991 |
| JP | 6-271788 | 2/1987 |
| JP | 3065341 | 3/1991 |
| JP | 7-35902 | 7/1995 |
| WO | WO 94/10230 | 5/1994 |
| WO | WO 99/49097 | 9/1999 |

* cited by examiner

Primary Examiner—James J. Seidleck
Assistant Examiner—Sanza L. McClendon
(74) Attorney, Agent, or Firm—Fulbright & Jaworski L.L.P.

(57) ABSTRACT

The invention relates to primer coating compositions exhibiting very good adhesion properties on a large variety of substrates, in particular plastic substrates such as ophthalmic lenses made of organic glasses and which also impart good impact resistance properties to the thus coated substrates. The invention also concerns substrates coated with these primer coating compositions as well as a method for making such coated substrates.

18 Claims, No Drawings

EPOXY/ACRYLATE BASED PRIMER COATING COMPOSITIONS AND THEIR USE IN THE OPTICAL FIELD

CROSS-REFERENCE TO RELATED APPLICATIONS

This application claims priority to U.S. Provisional Application Ser. No. 60/294,424 filed May 29, 2001.

BACKGROUND OF THE INVENTION

1. Field of the Invention

The present invention relates to primer coating compositions exhibiting very good adhesion properties on a large variety of substrates, in particular plastic substrates such as ophthalmic lenses made of organic glasses, and which also impart good impact resistance properties to the thus coated substrates.

The present invention also concerns substrates coated with these primer coating compositions as well as a method for making such coated substrates 2. Previous Art It is known to apply epoxy/acrylate based primer coating compositions on transparent substrates such as ophthalmic lenses.

Thus, Japanese patent JP 7-35902 discloses coating polyurethane lenses (MR6, with, successively, an epoxy/acrylate primer composition, an anti-abrasive silicone based coating and an anti-reflecting multiplayer coating. The resulting final lenses show good impact and abrasion resistances, good resistance to weathering, a good visual appearance, some colorability and a good adhesion between the layers. The epoxy/acrylate composition comprises acryl esters with OH groups, in particular of the bisphenol-A type.

Japanese patent JP 6-271788 discloses a primer coating composition comprising a mixture of a monomer bearing 1 to 3 acrylate functionalities and one or more hydroxy groups, a mono- or polyepoxy monomer and an initiator. A silicone based anti-abrasion coating and a multilayer anti-reflecting coating are then successively formed on the primer coating. The substrate is made of mineral glass. The coated substrate shows good impact and abrasion resistances, good resistance to weathering, a good visual appearance, as well as a good adhesion between the layers.

In comparative example 1 the substrate is a lens made of CR39® from PPG.

The coated lenses have good performances with regard to impact resistance and adhesion. However, these primer coatings have not proven to be successfully applicable on a large variety of organic substrates in particular (meth)acrylic or polycarbonate based substrates.

Additionally, due to the hydrophilicity of the acrylic constituent of the composition, the resulting coatings are quite sensitive to humidity What is needed is a primer coating composition which will provide improved impact resistance properties as well as good adhesion to a large variety of substrates, in particular organic glass substrates, and also to anti-abrasion coatings.

SUMMARY OF THE INVENTION

It is an object of this invention to provide a primer coating composition which can be used with a large variety of organic glass substrates, and which imparts to the coated substrate improved impact-resistance properties.

It is a further object of the invention to provide a primer coating composition which has good adhesion to a large variety of substrate materials and also to anti-abrasion resistant coatings typically used in the optical field, especially for making ophthalmic lenses.

It is another object of the invention to provide an impact-resistant primer coating composition which can be applied onto a substrate or a coated substrate using a direct deposition process such as a spin coating process, a dip coating process and a flow coating process or a transfer process such as the so-called "in mold coating (IMC)".

A still further object of the invention is to provide an impact-resistant primer coating composition having low sensitivity to humidity.

In accordance with the above objects and those that will be mentioned and will become apparent below, the impact-resistant primer coating composition according to the invention comprises:

at least one non-hydrophilic acrylate monomer;
at least one epoxy monomer; and
at least one photoactivable cationic catalyst.

DETAILED DESCRIPTION OF THE INVENTION

The acrylate monomer can be any acrylate monomer or mixtures thereof which exhibit a non-hydrophilic character. By non-hydrophilic character there is meant an acrylate monomer free of any hydrophilic group such as OH.

Preferably, the at least one non-hydrophilic acrylate monomer is a mixture of (a)at least one acrylate monomer selected from the group consisting of mono and difunctional acrylate monomers and (b) at least one acrylate monomer selected from the group consisting of tri to hexaacrylate monomers.

Among the acrylate monomers that can be used in the primer coating composition of the invention, there can be cited:

mono- and polyacrylic esters of mono- or polyhydric alkanols, in particular $C_1$–$C_{12}$ alkanols, such as methyl, ethyl, propyl, butyl, hexyl and pentaerythrityl mono- and polyacrylates;

mono- and polyacrylic esters of mono- or polyhydric cycloalkanols, such as cyclobutyl, cyclopentyl, cyclohexyl, cycloheptyl and isobornyl mono- and polyacrylates;

diacrylic esters of alkylene glycols and poly(alkylene) glycols, in particular ethylene and propylene glycol and poly(ethylene) and (propylene) glycols such as ethylene or propylene glycol diacrylate, diethylene or dipropylene glycol diacrylate, triethylene or tripropylene glycol diacrylate, tetraethyleneglycol diacrylate and poly(ethylene) glycol diacrylate having up to 600 ethoxy units, such as polyethylene (200) diacrylate, polyethylene (400) diacrylate and polyethylene (600) diacrylate; and mono- and polyacrylic esters of mono- or polyhydric arylalkyl alcohols such as phenoxyethylacrylate.

It shall be understood that, when the acrylate monomer derives from a polyol all the hydroxy groups of the polyol are esterified with acrylic acid in order to obtain a non-hydrophilic acrylate monomer.

Typically, the amount of acrylate monomer in the primer composition ranges from 10 to 50% by weight, preferably 20 to 35% by weight based on the total weight of acrylate and epoxy monomers present in the composition.

The epoxy monomer of the present primer composition can be any epoxy compound having one or more epoxy groups, in particular two, three or more epoxy groups.

Preferred epoxy monomers are glycidyl ethers of polyhydric alkanols such as di- or triglycidyl ethers of alkane diols and triols.

Among these epoxy monomers there can be cited 1,4-butanediol diglycidyl ether and trimethylolpropane triglycidyl ether.

Typically, the amount of epoxy monomer in the primer composition ranges from 50 to 90% by weight, preferably 70 to 85% by weight based on the total weight of acrylate and epoxy monomers present in the composition.

The photoactivable cationic catalyst of the primer composition can be any known photoactivable cationic catalyst, in particular UV activable cationic catalysts.

Among the photoactivable cationic catalysts there may be cited aromatic onium salts and iron arene salt complexes such as UVI 6990, UVI 6974.

The amount of cationic catalyst present in the composition usually ranges from 0.01 to 5% by weight, preferably from 1 to 3% by weight, based on the total weight of the epoxy monomers present in the composition.

The primer coating composition of the invention can be applied onto a large variety of plastic substrates, in particular transparent plastic materials commonly used for forming ophthalmic lenses. Among such plastic materials there can be cited carbonate, (meth)acrylic, thio(meth)acrylic, (diethyleneglycol bisallylcarbonate), urethane, thiourethane, homopolymers and copolymers and mixtures thereof.

When the substrate is a polycarbonate, preferably the primer coating composition comprises at least one penta or hexaacrylate monomer. When the substrate is a (meth)acrylic polymer, preferably the primer coating composition comprises at least one mono or diacrylate monomer, which generally represents up to 10% by weight of the total weight of the acrylate monomers.

The primer coating composition of the invention can be applied on the plastic material substrate using any well known direct coating method such as dip coating, flow coating and spin coating.

When such a direct coating method is used, the primer coating composition also preferably includes at least one photoinitiator for radical polymerisation of the monomers. These radical photoinitiators are well known in the art and include, for example Irgacure® 500 from CIBA SPECIALTY CHEMICAL and Darocur® 1173, Irgacure® 819, Irgacure® 184, benzophenone and acetophenone compounds.

The amount of radical photoinitiator usually ranges from 1 to 10% by weight, preferably from 2 to 7% by weight based on the total weight of the acrylic monomers present in the composition.

The primer coating composition can also be applied to the substrate using a transfer method such as the so-called "in mold coating (IMC)". This IMC method is disclosed, among others, in EP-A-102847 and U.S. Pat. Nos. 5,096,626, 5,160,668 and 5,733,483.

Briefly, this IMC method comprises providing a two-part mold, forming on at least one optical surface of the mold a layer of the primer coating composition according to the invention, optionally fully or partially curing the primer coating layer, assembling the mold parts, filling the molding cavity with a substrate precursor liquid curable monomer composition, curing the substrate composition and the primer coating layer if not already fully cured, and disassembling of the mold parts to recover the coated substrate. Then, preferably, the concentration of cationic catalyst is increased to between 8 to 14% by weight of the total epoxy concentration.

Two-part molds are well known in the art and are disclosed in particular in U.S. Pat. Nos. 5,547,618 and 5,662,839.

Curing of the primer coating composition and of the substrate composition typically comprises photocuring, preferably UV-curing.

When using the IMC method, although the primer composition may also contain one or more photoinitiator for radical polymerisation, however, in the case of a (meth)acrylic based substrate, the primer coating composition is preferably free of such photoinitiator which is then preferably included in the liquid polymerizable composition comprising the (meth)acrylic monomer used for forming the substrate. Then, preferably, the concentration of cationic catalyst is increased to between 8 to 14% by weight of the total epoxy concentrations.

The primer coating composition of the invention can be cured using any well known photopolymerization process, and in particular UV photopolymerization.

The thickness of the cured primer coating preferably ranges from 0.5 to 7 micrometers (μm), more preferably from 1 to 6 micrometers and even better from 2 to 5 micrometers.

The substrate coated with the primer coating can be overcoated with classical properties enhancing coatings such as anti-abrasion coating, anti-reflecting coating and top coat.

In particular an anti-abrasion coating can be applied onto the impact-resistant primer coating of the invention.

Anti-abrasion coatings are well known in the art.

Preferred anti-abrasion coatings are those made by curing a precursor composition including epoxyalkoxysilanes or a hydrolyzate thereof, silica and a curing catalyst Examples of such compositions are disclosed in U.S. Pat. No. 4,211,823; U.S. Pat. No. 5,015,523; and WO-94/10230.

The most preferred anti-abrasion coating compositions are those comprising as the main constituents an epoxyalkoxysilane such as, for example, γ-glycidoxypropyltrimethoxysilane (GLYMO) and optionally a dialkyldialkoxysilane such as, for example, dimethyldiethoxysilane (DMDES), colloidal silica and a catalyst amount of a curing catalyst such as aluminium acetylacetonate or a hydrolyzate thereof, the remaining of the composition being essentially comprised of solvents typically used for formulating these compositions.

These anti-abrasion coating compositions can be applied onto the primer coating using a direct coating method or a transfer method as described above.

Improved adhesion between the anti-abrasion coating and the impact-resistant primer coating is obtained using the primer coating according to the invention.

Anti-reflecting coatings and their methods of making are well known in the art. The anti-reflecting coating can be any layer or stack of layers which improves the anti-reflecting properties of the finished optical article.

The anti-reflecting coating may preferably consist of a mono- or multilayer film of dielectric materials such as SiO, $SiO_2$, $Si_3N_4$, $TiO_2$, $ZrO_2$, $Al_2O_3$, $MgF_2$ or $Ta_2O_5$, or mixtures thereof.

The anti-reflecting coating can be applied in particular by vacuum deposition according to one of the following techniques:
 1)-by evaporation, optionally ion-beam assisted;
 2)-by spraying using an ion beam;
 3)-by cathode sputtering; or
 4)-by plasma-assisted vapor-phase chemical deposition.

Preferably, the anti-reflecting coating is a multilayer film comprising three or more dielectric material layers of alternatively high and low refractive indexes.

Application of the anti-reflecting coating can be done directly on the already coated substrate or through a transfer method such as the IMC method.

The top coat, typically a hydrophobic top coat, which in the finished optical article constitutes the outermost coating on the optical substrate, is intended for improving the dirty mark resistance of the finished optical article. Such hydrophobic top coats are well known in the art and are usually made of silicones or fluorosilicones. They can be deposited using any classical deposition process, but preferably using thermal evaporation technique. They can be applied on the coated substrate using a direct or a transfer method.

The following examples illustrate the present invention. In the examples, unless otherwise stated, all parts and percentages are by weight.

COMPARATIVE EXAMPLES A AND B AND EXAMPLES 1 AND 2

Primer coating compositions 1 to 6 were prepared by mixing the ingredients as indicated in table I below.

Coating Preparation (Composition 3):

12.47 parts of pentaerythritol pentaacrylate was added to a clean dry light resistant glass bottle. Next, 11.96 parts of tripropyleneglycol diacrylate was added. 17.29 parts of 1,4-butanediol diglycidyl ether and 34.23 parts of trimethylolpropane triglycidyl ether were then added. To this mixture, 7.11 parts of each n-propanol, Dowanol-PM, and Arcosolv PnP were added and the bottle was closed. The mixture was gently shaken to form a homogeneous solution. Afterwards, 1.24 parts of Darocur 1173 (free radical photoinitiator) and 1.34 parts of UVI-6974 (cationic photo-initiator—mixed triarylsulfonium hexafluoroantimonate salts) were added. Finally, 0.1 parts of a 50% mixture of 3.M FC-430 in methanol was added. The bottle was again closed and gently shaken until the solution was homogeneous. Due to the foaming nature of the FC-430 surfactant, it is necessary to place the closed bottle in an ultrasonic water bath for approximately 20 minutes to eliminate bubbles prior to use. The particular order of addition of the acrylates and epoxies is not important. However, the solvents, catalyst, and surfactant should be added afterwards to minimize foaming and prevent loss of solvent.

Coating Preparation (Compositions 1, 2, 4, 5 and 6):

The coatings describes in compositions 1, 2, 4, 5 and 6 are prepared in the same way as that of composition 3. The acrylates and/or the epoxies are added and mixed followed by the solvent mixture, photoinitiators, and finally the surfactant mixture if called for.

TABLE I

| | Ingredients | Comp. 1 | Comp. 2 | Comp. 3 | Comp. 4 | Comp. 5 | Comp. 6 |
| --- | --- | --- | --- | --- | --- | --- | --- |
| ACRYLATES | Pentaerythritol pentaacrylate | 31.82 | — | 12.47 | 12.12 | 9.17 | 12.34 |
| | Tripropylene glycol diacrylate | 33.19 | — | 11.96 | — | 6.14 | — |
| | 2-phenoxyethyl acrylate | — | — | — | 6.00 | — | 6.11 |
| EPOXY RESINS | 1,4-butanediol diglycidyl ether | — | 21.21 | 17.29 | 40.75 | 2.58 | — |
| | 3,4-Epoxy cyclohexylmethyl-3,4-epoxycyclohexane carboxylate | — | — | — | — | 2.49 | 41.49 |
| | Trimethylol propane triglycidyl ether | — | 42.01 | 34.23 | 14.39 | — | 14.65 |
| SOLVENT MIXTURE | n-propanol | 11.09 | 11.72 | 7.11 | 8.22 | 5.34 | 25.11 |
| | Dowanol PM | 11.09 | 11.72 | 7.11 | 8.22 | 5.34 | — |
| | Arcosolv PnP | 11.09 | 11.72 | 7.11 | 8.22 | 5.34 | — |
| | Diacetone alcohol | — | — | — | — | 35.86 | — |
| PHOTOINITIATORS | Darocur 1173 | 1.62 | — | 1.24 | 1.25 | 0.53 | — |
| | UVI-6974 | — | 1.49 | 1.34 | 0.73 | 0.06 | 0.30 |
| | Irgacure 819 | — | — | — | — | 0.71 | — |

TABLE I-continued

| Ingredients | | Comp. 1 | Comp. 2 | Comp. 3 | Comp. 4 | Comp. 5 | Comp. 6 |
|---|---|---|---|---|---|---|---|
| NANOPARTICLES | HIT 32.M | — | — | — | — | 26.43 | — |
| FLOW ADDITIVE | FC-430/MeOH (1:1) | 0.09 | 0.12 | 0.13 | 0.10 | 0.01 | — |

Dowanol PM: 1-methoxy-2-propanol and 2-methoxy-1-propanol solvent commercialised by DOW CHEMICAL.
Arcosolv PnP: solvent commercialised by DOW CHEMICAL comprising a mixture of 1-propoxy-2-propanol, 2-propoxy-1-propanol, propyleneglycol, diethyleneglycol and dipropylglycolmonopropylether.
HIT 32.M: colloidal stannic-titanium-zirconium oxide in methanol from NISSAN CHEMICAL.
Darocur 1173:

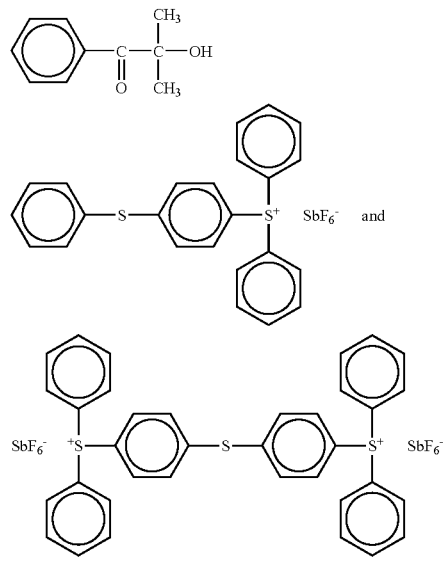

UVI-6974: mixture of

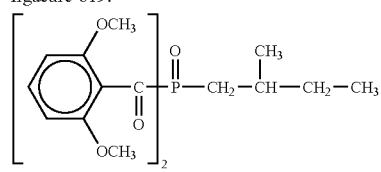

Irgacure 819:

FC-430: surfactant commercialised by 3M.

Various plastic material substrates were coated with the above primer coating compositions using the following procedure:

Approximately 2 milliliters of the primer coating composition is applied to either the concave or the convex side of a finished or a surfaced semi-finished plano lens having a diameter of 70 mm and a center thickness of 2.0 mm for Mean index material and CR-39® and a center thickness of 1.5 mm for polycarbonate and Thin & Lite®. The primer is applied at a flow rate of ~0.5 ml/second by spin coating. The coating is applied at a centrifugal speed of 600 rpm for 8 seconds followed by a final spin speed of 1400 rpm for a period of 10 seconds to apply a uniform film at a thickness of between 1 and 10 microns, preferably between 2 and 5 microns. The coating is then cured (polymerized) using UV radiation. A Fusion H-bulb was used at a distance of 12 cm from the lens. Typical energies necessary for cure are listed below:

| Power puck readings: | |
|---|---|
| UV-A | 1.473 J/cm$^2$ (0.848 W/cm$^2$) |
| UV-B | 1.384 J/cm$^2$ (0.765 W/cm$^2$) |
| UV-C | 0.196 J/cm$^2$ (0.103 W/cm$^2$) |
| UV-V | 1.073 J/cm$^2$ (0.605 W/cm$^2$) |

Dry adhesion of the resulting coatings to the substrates and nature of the substrates are given in table II below:

TABLE II

| | | Dry adhesion test | | | |
|---|---|---|---|---|---|
| | Primer | SUBSTRATE | | | |
| Example no | coating composition | CR-39® | Mean index material | PC | THIN & LITE® |
| Comparative A | 1 | Fail | Fail | Pass | Fail |
| Comparative B | 2 | Pass | Pass | Fail | Pass |
| 1 | 3 | Pass | Pass | Pass | Pass |

TABLE II-continued

Dry adhesion test

| Example no | Primer coating composition | SUBSTRATE | | | |
|---|---|---|---|---|---|
| | | CR-39® | Mean index material | PC | THIN & LITE® |
| 2 | 4 | Pass | Pass | Pass | Pass |
| 3 | 5 | — | — | — | Pass |
| 4 | 6 | — | Pass | — | — |

CR-39 ®: diethyleneglycol bisallyl carbonate copolymer from PPG INDUSTRIES.
Mean index material (1.55) (see table VIII)
PC: polycarbonate.
THIN & LITE ®

EXAMPLES 5 TO 6 AND COMPARATIVE EXAMPLES C AND D

The above substrates coated with the primer coating compositions were coated with an organosilane abrasion-resistant coating composition.

This coating composition identified as hard coating n°1 is prepared as described in U.S. Pat. No. 4,211,823 and is a mixture of GLYMO hydrolyzed in HCl 0.1N and colloidal silica $$\left(\text{with a ratio } \frac{\text{GLYMO}}{\text{Colloidal silice (dry extract)}} \text{about 2}\right)$$

and a catalytic amount of aluminum acetylacetonate, with about one third (by weight) of the composition being methanol.

This organosilane hard coating composition n°1 is applied by dip or spin at a coating thickness of 2 microns.

The coated lens is then cured for a period o 15 minutes at 80° C. up to a tack free state. The coating is then further cured for a period of 3 hours at 100° C.

Dry adhesion of the anti-abrasion coating to the primer coating, Bayer abrasion resistance, and steel wool scratch resistance of the resulting coated substrates were measured. The results are given in tables III and IV.

TABLE III

Dry adhesion test

| Example no | Primer coating composition | SUBSTRATE | | | |
|---|---|---|---|---|---|
| | | CR-39® | Mean index material | PC | THIN & LITE® |
| Comparative C | 1 | N/A | N/A | Fail | N/A |
| Comparative D | 2 | Pass | Pass | N/A | Pass |
| 5 | 3 | Pass | Pass | Pass | Pass |
| 6 | 4 | Pass | Pass | Pass | Pass |

N/A: not able to measure.

TABLE IV

Abrasion resistance test

| Example no | CR-39® | Mean index material | PC | THIN & LITE® |
|---|---|---|---|---|
| Comparative C | 4.69/0.12 | 4.62/0.32 | 4.03/1.26 | 3.83/0.20 |
| Comparative D | 5.42/0.19 | 4.58/0.26 | 5.14/0.43 | 4.70/0.15 |
| 5 | 5.58/0.14 | 5.80/0.15 | 4.89/0.15 | 5.41/0.14 |

First value = Bayer value
Second value = Steel wool value

The coated substrate of example 4 was subjected to accelerated aging tests. The results of these tests are given in table V below:

TABLE V

Accelerated aging tests

| HOURS | QUV | SUNTEST |
|---|---|---|
| 50 | Pass | Pass |
| 100 | Pass | Pass |
| 150 | Pass | Pass |
| 200 | Pass | |

EXAMPLES 7 TO 10

Various tinted substrates were coated as described above with primer coating composition n°4 and the above described anti-abrasion organosilane coating composition. Dry adhesion and adhesion after 30 minutes in boiling water of the resulting coated substrates were measured. The results and the nature of the tinted substrates are given in table VI below:

TABLE VI

| SUBSTRATE | DRY ADHESION | ADHESION AFTER 30' IN BOILING WATER |
|---|---|---|
| CR-39® (FSV) | Pass | Pass |
| CR-39® (SF-surfaced) | Pass | Pass |
| Thin & Lite® (SF-surfaced) | Pass | Pass |
| Mean index substrate (SF-surfaced) | Pass | Pass |

CR-39 ® (FSV) Finished Single Vision lens
CR-39 ® (SF-surfaced): Semi-finished - surfaced lens
Thin & Lite ® (SF-surfaced): Semi-finished - surfaced lens
Mean index substrate (SF-surfaced): Semi-finished - surfaced lens The above examples show that the primer coating compositions according to the invention exhibit good adhesion on a large variety of thermoplastic and thermosetting plastic materials and also provide good inter-coating adhesion to classical organopolysiloxane anti-abrasion coatings. Further, adhesion of the primer coatings of the invention to the substrate does not require prior surface modification of the substrate.

EXAMPLE 11

The front part of a polycarbonate two-part mold already coated with a hydrophobic top coat and an AR coating was coated with an anti-abrasion coating composition (hard coating 2). Hard coating application speed was set at 600 rpm for 8 seconds and spin off speed at 1200 rpm for 10 seconds. Hard coating is UV cured by Fusion system H bulb at (5 feet per minute) 1.524 m/minute and followed by 30 seconds IR cure at 725F for 30 seconds, using LESCO IR curing unit. Coated mold was allowed to cool to room temperature and Impact Primer Coating composition of table VI below was applied at the same speed and timing as mentioned above. Impact primer coating was cured by UV light, using Fusion SYSTEM H bulb with belt speed of (5 feet per minute) 1.524 m/minute.

The coated plastic mold was assembled, filed with a liquid optical substrate composition and polymerized within 20 minutes. Upon disassembly of the mold, all of the coatings transferred to the finished lens.

The impact primer coating, substrate and hard coating compositions are given in tables VII, VIII and IX below:

TABLE VII

Impact Primer Coating Composition

| Component | Parts by weight |
| --- | --- |
| Pentaerithritol Pentaacrylate | 12.34 |
| 2-Phenoxyethyl Acrylate | 6.11 |
| 3,4-Epoxycyclohexylmethyl-3,4-epoxycyclohexane Carboxylate | 41.49 |
| Trimethylolpropane Triglycidyl Ether | 14.65 |
| n-propanol | 25.11 |
| Cyracure ® UVI-6974 | 0.30 |

TABLE VIII

Optical substrate composition (Mean index material)

| Component | Parts by weight |
| --- | --- |
| Tetraethoxy bisphenol A dimethacrylate | 980 |
| Methyl butene-1 ol | 20 |
| Irgacure 1850 | 1.75 |

Irgacure 1850: mixture (50/50 by weight) of:

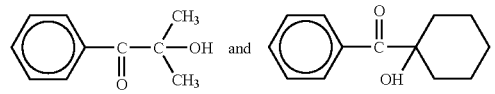

TABLE IX

Hard coating composition 2

| Component | Composition 2 |
| --- | --- |
| Glymo | 23.75 |
| Colloidal silica/MeOH | 47.51 |
| Tyzor DC (1% dilution) | 14.25 |
| n-propanol | 14.25 |
| UVI-6974 | 0.2735 |

Glymo: γ-glycidoxypropyltrimethoxysilane
Colloidal silica: Sun Colloid MA-ST from NISSAN Company
Tyzor DC:

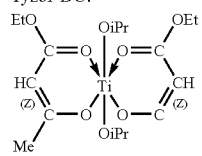

The hydrophobic top coat and anti-reflecting coating were deposited on the optical surface of the front part of the mold as follows:

The hydrophobic top coat and anti-reflecting treatments are accomplished in a standard box coater using well known vacuum evaporation practices.

a) The mold is loaded into the standard box coater such as a Balzers BAK760 and the chamber is pumped to a high vacuum level.

b) Hydrophobic top coat, fluorosilazane (Shin Etsu KP801M), is deposited onto the optical surface of the first part of the mold using a thermal evaporation technique, to a thickness in the range of 2–15 nm.

c) The dielectric multilayer anti-reflecting (AR) coating, consisting of a stack of high- and low-index materials is then deposited, in reverse of the normal order.

The first layer is a layer of $SiO_2$ having a physical thickness of 80–110 nm (optical thickness about 100–160 nm).

The second layer is a layer of $ZrO_2$ having a thickness of about 100 nm, the third layer is a $SiO_2$ layer having a thickness of about 30 nm and the fourth layer is a $ZrO_2$ having a thickness of about 55 nm.

d) At the completion of the deposition of the four-layer anti-reflecting stack, a thin layer of $SiO_2$, having a physical thickness of 1–50 nm, is deposited.

This layer is to promote adhesion between the oxide antireflecting stack and the subsequent hard-coating which will be deposited on the coated mold at a later time.

Dry adhesion, abrasion resistance, light transmission and impact resistance of the coated resulting lens were measured. Results are given in Table X below:

TABLE X

| Example no | Nx10 blows AR adhesion | Dry adhesion test | Bayer abrasion test | Steel wool test | Transmission (%) | Impact energy (mJ) |
| --- | --- | --- | --- | --- | --- | --- |
| 11 | n > 12 | Pass | 6.31 | 1 | 98.8 | 65.36 Tc: 1.34 |

Tc = Thickness at center: 1.34 mm

Nx10 blows is described in patent application WO99/49097 (ESSILOR). The given value is the number of cycles that an anti-reflection treated lens can bear before the appearance of a defect.

Abrasion-Resistance Tests

Bayer abrasion resistance was determined by measuring the percent haze of a coated and uncoated lens, before and after testing on an oscillating sand abrader as in ASTM F 735-81. The ratio of the uncoated lens haze (final-initial) is a measure of the performance of the coating, with a higher ratio meaning a higher abrasion resistance.

Steel wool scratch resistance was determined by hand with a steel wool 0 0 0 grade.

Adhesion Tests

Dry adhesion was measured by cutting through the coating a series of 10 lines, spaced 1 mm apart, with a razor, followed by a second series of 10 lines, spaced 1 mm apart, at right angles to the first series, forming a crosshatch pattern. After blowing off the crosshatch pattern with an air stream too remove any dust formed during scribing, clear cellophane tape was then applied over the crosshatch pattern, pressed down firmly, and then rapidly pulled away from coating in a direction perpendicular to the coating surface. Application and removal of fresh tape was then repeated two additional times. The lens was then submitted to tinting to determine the percentage adhesion, with tinted areas signifying adhesion failures.

Adhesion after 30 minutes in boiling water was effected as indicated for the dry adhesion but after having immersed the test samples in boiling water for 30 minutes.

Coating passes adhesion tests when percentage adhesion is more than 95%.

Light Transmission Test

Transmission was measured using a BYK GARDNER Haze-guard plus hazemeter catalog n°4725.

Impact Resistance Test

Impact energy was measured using a proprietary system but can be measured by using the protocole of FDA drop ball test with increasing weights for the ball up to the breaking of the lens or the appearance of a visual crack, generally having the shape of a star, where the ball impacted. The corresponding energy is then measured.

The invention claimed is:

1. An impact-resistant primer coating composition comprising:
   at least one non-hydrophilic acrylate monomer;
   at least one epoxy monomer; and
   at least one photoactivable cationic catalyst,
   wherein said at least one non-hydrophilic acrylate monomer comprises a mixture of:
   (a) at least one acrylate monomer selected from the group consisting of mono and diacrylate monomers, and
   (b) at least one acrylate monomer selected from the group consisting of tri to hexaacrylate monomers.

2. The primer coating composition of claim 1, further comprising a radical photoinitiator.

3. The primer coating composition of claim 1, wherein the epoxy monomer is selected from glycidylethers of polyhydric alkanols.

4. The primer coating composition of claim 1, wherein the photoactivable cationic catalyst is selected from the group consisting of aromatic onium salts and iron arene salt complexes.

5. The primer coating composition of claim 2, wherein the radical photoinoitiator is selected from benzophenone and acetophenone compounds.

6. A plastic material substrate having at least one face coated with a primer coating made of a primer coating composition as set forth in claim 1.

7. The plastic material substrate of claim 6, wherein the substrate is selected from carbonate, (meth)acrylic, thio (meth)acrylic, (diethyleneglycol bisallylcarbonate), urethane, thiourethane homo and copolymers and mixtures thereof.

8. The plastic material substrate of claim 6, wherein the substrate is polycarbonate and the primer coating composition comprises a penta or hexaacrylate monomer.

9. The plastic material substrate of claim 6, wherein the substrate is a (meth)acrylic polymer and the primer coating composition comprises a mono or diacrylate monomer.

10. The plastic material substrate of claim 6 consisting of an ophthalmic lens.

11. A method for making a plastic material substrate having at least one face coated with an impact-resistant primer coating which comprises:
    providing a two-part mold having optical surfaces defining a molding cavity;
    forming on at least one optical surface a layer of the primer coating composition as set forth in claim 1 and optionally fully or partially curing it;
    filling the molding cavity with a substrate precursor liquid curable monomer composition;
    curing the substrate precursor composition and the primer layer if not already fully cured; and
    disassembling the mold to recover the impact-resistant primer coated substrate.

12. The method of claim 11, wherein the primer coating composition does not contain radical photoinitiator and the substrate precursor composition comprises a (meth)acrylic monomer and at least one radical photoinitiator.

13. The primer coating composition of claim 1, wherein the at least one acrylate monomer is present in an amount of 10% to 50% by weight based on the total weight of the acrylate and epoxy monomers present in the composition.

14. The primer coating composition of claim 13, wherein the at least one acrylate monomer is present in an amount of 20% to 35% by weight based on the total weight of the acrylate and epoxy monomers present in the composition.

15. The primer coating composition of claim 1, wherein the at least one epoxy monomer is present in an amount of 50% to 90% by weight based on the total weight of the acrylate and epoxy monomers present in the composition.

16. The primer coating composition of claim 15, wherein the at least one epoxy monomer is present in an amount of 70% to 85% by weight based on the total weight of the acrylate and epoxy monomers present in the composition.

17. The primer coating composition of claim 1, wherein the at least one cationic catalyst is present in an amount of 0.01% to 5% by weight based on the total weight of the epoxy monomers present in the composition.

18. The primer coating composition of claim 1, wherein the at least one cationic catalyst is present in an amount of 1% to 3% by weight based on the total weight of the epoxy monomers present in the composition.

* * * * *